US012276928B2

(12) United States Patent
Takagi et al.

(10) Patent No.: US 12,276,928 B2
(45) Date of Patent: Apr. 15, 2025

(54) TRANSFER DEVICE AND IMAGE FORMING APPARATUS

(71) Applicants: Hiroaki Takagi, Kanagawa (JP); Takahiro Konishi, Tokyo (JP); Tomoaki Suga, Kanagawa (JP)

(72) Inventors: Hiroaki Takagi, Kanagawa (JP); Takahiro Konishi, Tokyo (JP); Tomoaki Suga, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/419,996

(22) Filed: Jan. 23, 2024

(65) Prior Publication Data

US 2024/0272568 A1 Aug. 15, 2024

(30) Foreign Application Priority Data

Feb. 14, 2023 (JP) ................................ 2023-020863

(51) Int. Cl.
*G03G 15/20* (2006.01)
*G03G 15/16* (2006.01)

(52) U.S. Cl.
CPC ................................ *G03G 15/1615* (2013.01)

(58) Field of Classification Search
CPC ............... G03G 15/08; G03G 15/0865; G03G 15/0868; G03G 15/0877; G03G 15/1615; G03G 2215/0132
USPC ............ 399/121, 297, 302, 303, 308, 313, 2
See application file for complete search history.

(56) References Cited

U.S. PATENT DOCUMENTS

| | | | |
|---|---|---|---|
| 9,367,018 B1 | 6/2016 | Yanagawa et al. |
| 2006/0120748 A1 | 6/2006 | Takehara et al. |
| 2010/0232819 A1 | 9/2010 | Kudo et al. |
| 2010/0239282 A1 | 9/2010 | Ashikawa et al. |
| 2011/0110691 A1 | 5/2011 | Hirose et al. |
| 2012/0190489 A1 | 7/2012 | Takagi |
| 2013/0071150 A1 | 3/2013 | Takagi |
| 2014/0147160 A1 | 5/2014 | Konishi |

(Continued)

FOREIGN PATENT DOCUMENTS

| | | | |
|---|---|---|---|
| CN | 101334599 | * 12/2008 |
| JP | 2016-033639 A | 3/2016 |

OTHER PUBLICATIONS

U.S. Appl. No. 18/220,844, filed Jul. 12, 2023.

(Continued)

*Primary Examiner* — Hoan H Tran
(74) *Attorney, Agent, or Firm* — Harness, Dickey & Pierce, P.L.C.

(57) ABSTRACT

A transfer device includes a belt unit having a transfer belt looped around tension rollers including a transfer roller, a unit support housing including a first support portion to support one end of the belt unit rotatably in an axial direction, and a second support portion to support another end of the belt unit rotatably in the axial direction, the unit support housing supporting the belt unit through the first support portion and the second support portion around a moving direction of the transfer belt, a pair of biasing members, and a driver disposed to rotate to generate rotary driving force to be conveyed to a driven portion provided for one of the tension rollers, the rotary driving force of the driver acting in a direction different from a direction in which the posture of the belt unit is not restricted.

7 Claims, 9 Drawing Sheets

(56) References Cited

U.S. PATENT DOCUMENTS

| | | | |
|---|---|---|---|
| 2015/0043928 | A1 | 2/2015 | Konishi et al. |
| 2015/0050080 | A1 | 2/2015 | Morita et al. |
| 2015/0240879 | A1 | 8/2015 | Takagi et al. |
| 2015/0346643 | A1 | 12/2015 | Konishi et al. |
| 2015/0346651 | A1 | 12/2015 | Nagata et al. |
| 2016/0033915 | A1 | 2/2016 | Kumagai et al. |
| 2016/0062300 | A1 | 3/2016 | Takagi et al. |
| 2016/0223977 | A1 | 8/2016 | Yamazaki et al. |
| 2016/0231562 | A1 | 8/2016 | Suga |
| 2016/0238981 | A1 | 8/2016 | Suido et al. |
| 2016/0313693 | A1 | 10/2016 | Fujiya et al. |
| 2017/0010566 | A1 | 1/2017 | Kato et al. |
| 2017/0010576 | A1 | 1/2017 | Takagi et al. |
| 2017/0168429 | A1 | 6/2017 | Imai et al. |
| 2017/0357200 | A1 | 12/2017 | Takagi et al. |
| 2018/0074455 | A1 | 3/2018 | Takagi |
| 2019/0286017 | A1 | 9/2019 | Nakamoto et al. |
| 2020/0004187 | A1 | 1/2020 | Takagi et al. |
| 2020/0063851 | A1 | 2/2020 | Nakamoto et al. |
| 2020/0064765 | A1 | 2/2020 | Suga et al. |
| 2020/0133172 | A1 | 4/2020 | Konishi et al. |
| 2020/0174395 | A1 | 6/2020 | Takagi |
| 2020/0326648 | A1 | 10/2020 | Maehata et al. |
| 2022/0308517 | A1 | 9/2022 | Takagi |
| 2023/0042229 | A1 | 2/2023 | Nakamura et al. |
| 2023/0090307 | A1 | 3/2023 | Konishi |
| 2023/0113719 | A1 | 4/2023 | Suga |
| 2023/0375975 | A1 | 11/2023 | Konishi |
| 2023/0393494 | A1 | 12/2023 | Konishi |
| 2023/0393495 | A1 | 12/2023 | Takagi |
| 2023/0393496 | A1 | 12/2023 | Takagi |
| 2024/0012347 | A1 | 1/2024 | Konishi |

OTHER PUBLICATIONS

U.S. Appl. No. 18/332,195, filed Jun. 9, 2023.
U.S. Appl. No. 18/223,554, filed Jul. 19, 2023.
U.S. Appl. No. 18/232,354, filed Aug. 10, 2023.
U.S. Appl. No. 18/378,655, filed Oct. 11, 2023.
U.S. Appl. No. 18/235,887, filed Aug. 21, 2023.
U.S. Appl. No. 18/224,574, filed Jul. 21, 2023.
U.S. Appl. No. 18/376,850, filed Oct. 5, 2023.
U.S. Appl. No. 18/518,601, filed Nov. 24, 2023.
U.S. Appl. No. 18/512,008, filed Nov. 16, 2023.

* cited by examiner

TRANSFER DEVICE AND IMAGE FORMING APPARATUS

CROSS-REFERENCE TO RELATED APPLICATION

This patent application is based on and claims priority pursuant to 35 U.S.C. § 119(a) to Japanese Patent Application No. 2023-020863, filed on Feb. 14, 2023, in the Japan Patent Office, the entire disclosure of which is hereby incorporated by reference herein.

BACKGROUND

Technical Field

Embodiments of the present disclosure relate to a transfer device and an image forming apparatus.

Background Art

In the related art, transfer devices of so-called belt type have been proposed that include a belt unit that includes a transfer belt looped around a plurality of tension rollers including a transfer roller, a unit support housing that rotatably supports the belt unit, and a biasing member that presses the belt unit. As the belt unit is pressed by the biasing member, the transfer roller contacts an image bearer through the transfer belt to form a transfer nip.

In the related art, a secondary transfer unit that serves as the belt unit is rotatably supported by a unit support housing provided with a biasing member that serves as the biasing member.

SUMMARY

Embodiments of the present disclosure described herein provide a transfer device including a belt unit having a transfer belt looped around a plurality of tension rollers including a transfer roller, a unit support housing including a first support portion to support one end of the belt unit rotatably in an axial direction, and a second support portion to support another end of the belt unit rotatably in the axial direction, the unit support housing supporting the belt unit through the first support portion and the second support portion around a moving direction of the transfer belt, a pair of biasing members, one of the pair of biasing members being rotatably supported by the first support portion and pressing one end of each one of the plurality of tension rollers of the belt unit in an axial direction, another one of the pair of biasing members being rotatably supported by the second support portion and pressing another end of each one of the plurality of tension rollers of the belt unit in the axial direction, the transfer roller contacting an image bearer through the transfer belt to form a transfer nip, the second support portion having a trench into which a supported portion of the another end of the belt unit in the axial direction is inserted, the supported portion having a degree of freedom in a pressing direction where the pair of biasing members press the belt unit when the transfer nip is formed, the unit support housing supporting the belt unit without restricting a posture of the belt unit around the moving direction of the transfer belt at the transfer nip, and a driver disposed to rotate to generate rotary driving force to be conveyed to a driven portion provided for one of the plurality of tension rollers, the rotary driving force of the driver acting in a direction different from a direction in which the posture of the belt unit is not restricted.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

FIG. 7A-1, FIG. 7A-2, FIG. 7B-1, and FIG. 7B-2 are diagrams illustrating how a secondary transfer unit that is twisted under normal conditions is attached to a drawer housing, according to an embodiment of the present disclosure.

FIG. 8A-1, FIG. 8A-2, FIG. 8B-1, and FIG. 8B-2 are diagrams illustrating how a secondary transfer roller of a secondary transfer unit, which is twisted under normal conditions, contacts an intermediate transfer belt, according to an embodiment of the present disclosure.

FIG. 9A-1, FIG. 9A-2, FIG. 9B-1, and FIG. 9B-2 are diagrams illustrating how a secondary transfer roller contacts an intermediate transfer belt when a secondary transfer unit is twisted under normal conditions and a rear portion of a secondary transfer roller is positioned higher than a front portion of the secondary transfer roller, according to an embodiment of the present disclosure.

Figure 1:
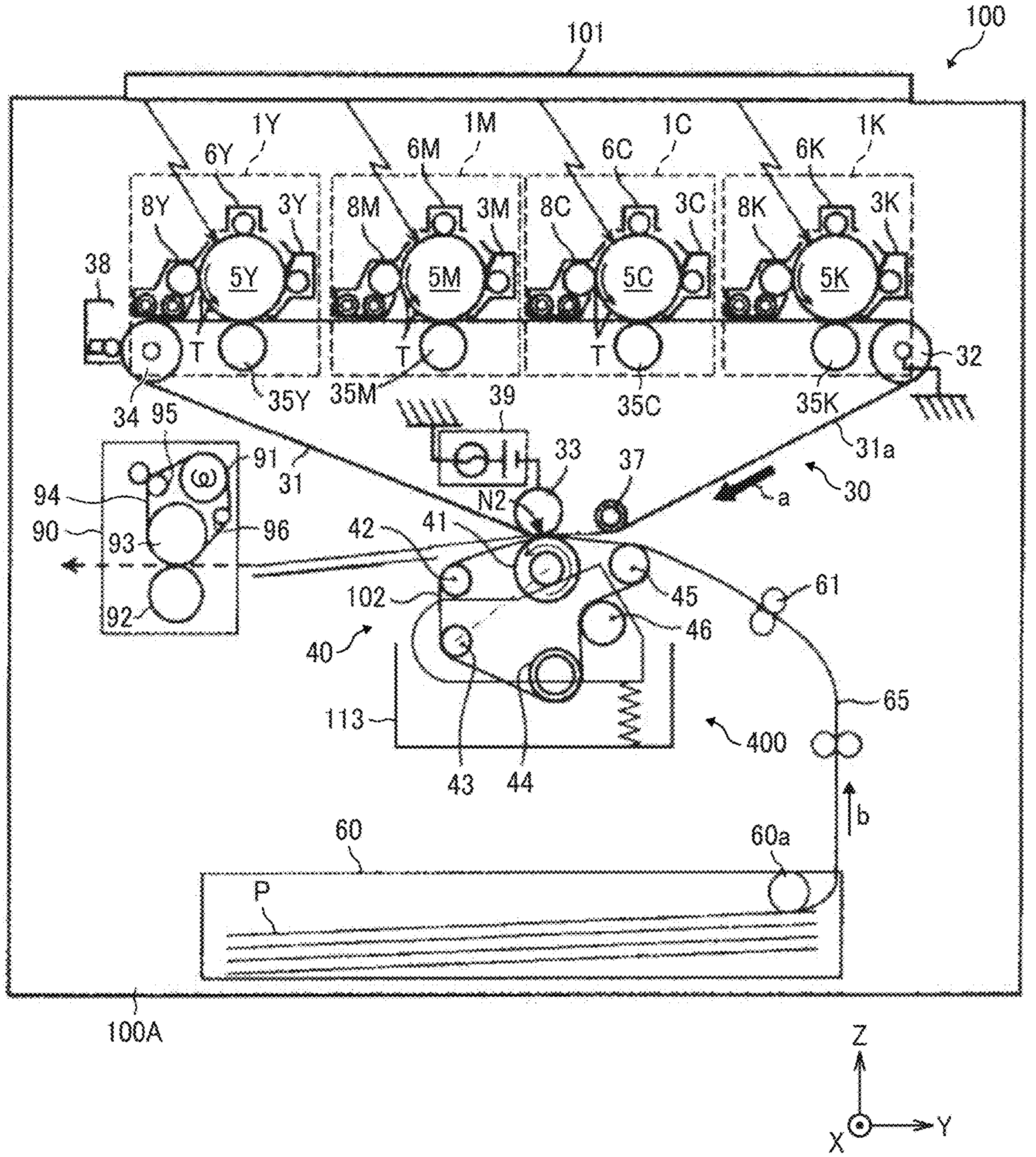
FIG. 1 is a schematic diagram illustrating a configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to limit the present disclosure. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

Embodiments of the present disclosure are described below with reference to the drawings.

FIG. 1 is a schematic diagram illustrating a configuration of an electrophotographic color printer 100 that serves as an image forming apparatus, according to an embodiment of the present disclosure.

Such an electrophotographic color printer 100 according to the present embodiment may be referred to simply as a printer 100 in the following description. The printer 100 is provided with four image forming units 1Y, 1M, 1C, and 1K that form toner images T of yellow, magenta, cyan, and black, respectively. The printer 100 according to the present embodiment is also provided with, for example, a transfer unit 30 as an intermediate transfer device, a secondary transfer unit 40, a cassette 60 that stores a recording material P as a to-be-conveyed object, and a fixing device 90.

The four image forming units 1Y, 1M, 1C, and 1K that serve as image forming devices use toners of Y, M, C, and K colors as powder developers. Those Y, M, C, and K colors are different from each other. In the other aspects, those four image forming units 1Y, 1M, 1C, and 1K have the same structure or configuration. The image forming units 1Y, 1M, 1C, and 1K are provided with, for example, drum-shaped photoconductors 2Y, 2M, 2C, and 2K that serve as latent image bearers, photoconductor cleaners 3Y, 3M, 3C, and 3K, electric-charge removing devices, charging devices 6Y, 6M, 6C, and 6K, and developing devices 8Y, 8M, 8C, and 8K.

The photoconductors 2Y, 2M, 2C, and 2K have surfaces that are evenly charged by the charging devices 6Y, 6M, 6C, and 6K. Subsequently, the surfaces of the photoconductors 2Y, 2M, 2C, and 2K are optically scanned by exposure light such as the laser beams emitted from a plurality of optical writing units 101 disposed above the image forming units 1Y, 1M, 1C, and 1K. As a result, multicolor electrostatic latent images are formed.

These electrostatic latent images are developed by developing devices 8Y, 8M, 8C, and 8K each of which has toner of different color, and turn to multicolor toner images T. A toner image is formed on each one of the multiple photoconductors 2. The toner images T on the photoconductors 2Y, 2M, 2C, and 2K are primarily transferred and borne onto the front surface of the intermediate transfer belt 31 composed of an endless belt.

The transfer unit 30 that serves as an intermediate transfer device and makes the intermediate transfer belt 31 stretched and seamlessly rotate and move in a clockwise direction as illustrated in FIG. 1 is arranged below the image forming units 1Y, 1M, 1C, and 1K. In the present embodiment, the direction in which the intermediate transfer belt 31 moves is referred to as a belt movement direction a.

In addition to the intermediate transfer belt 31, the transfer unit 30 according to the present embodiment includes, for example, a drive roller 32, a secondarily-transferring backside roller 33, a cleaning backup roller 34, four primary transfer rollers 35Y, 35M, 35C, and 35K, and a pre-transfer roller 37. The intermediate transfer belt 31 is looped around and supported by the drive roller 32, the secondary transfer backside roller 33, the cleaning backup roller 34, the four primary transfer rollers 35Y, 35M, 35C, and 35K, and the pre-transfer roller 37. As a driver such as a drive motor drives the drive roller 32 to rotate in a clockwise direction, the intermediate transfer belt 31 is conveyed to seamlessly move in the same clockwise direction as illustrated in FIG. 1.

A secondary transfer unit 40 that includes a secondary transfer belt 102 is arranged outside and below the loop of the intermediate transfer belt 31. The secondary transfer belt 102 according to the present embodiment serves as a belt member or a transfer belt. The secondary transfer belt 102 is looped around a plurality of tension rollers including the secondary transfer roller 41.

A cassette 60 that serves as a container and stores a plurality of recording materials P in a stacked state is arranged below the secondary transfer unit 40. In the cassette 60, the roller 60$a$ contacts the uppermost one of the recording materials P of the bundle, and is driven to rotate at a prescribed timing to feed the recording material P from the cassette 60 to a conveyance path 65 toward the secondary transfer nip N2. The recording material P that is fed and sent to the conveyance path 65 is then sent by a registration roller pair 61 to the secondary transfer nip N2 at a synchronized timing in the secondary transfer nip N2 with the toner image on the front surface of the intermediate transfer belt 31.

The toner images on the front surface of the intermediate transfer belt 31 are secondarily transferred onto the recording material P all at once at the secondary transfer nip N2 by the operations of the secondary-transfer electric field and the pressure at the transfer nip to form a full-color toner image together with the white color of the recording material P.

The fixing device 90 is arranged downstream from the secondary transfer nip N2 in a direction b where the recording material P is conveyed. The fixing device 90 according to the present embodiment is provided with a heating roller 91, a fixing roller 93, a support roller 96, and a tension roller 95 as support rollers for the fixing belt 94.

The fixing device 90 according to the present embodiment is also provided with a pressure roller 92 that contacts the fixing roller 93 with the fixing belt 94 interposed therebetween. The recording material P on which the toner image T is transferred is fed into the fixing device 90, and is nipped at a fixing nip where the fixing roller 93 and the pressure roller 92 contact each other.

In the fixing device 90 according to the present embodiment, the heat from the heating roller 91 provided with a heat source inside is conducted to the recording material P by the application of pressure at the nip and the fixing belt 94, and the toner in the full-color toner image is softened and fixed. The recording material P onto which an image has been fixed is ejected from the fixing device 90 to the outside.

As illustrated in FIG. 1, the secondary transfer device 400 according to the present embodiment has the secondary transfer unit 40 that serves as a belt unit, and a drawer housing 113 that serves as a unit support housing to support the secondary transfer unit 40 in a rotatable manner. The secondary transfer unit 40 according to the present embodiment is provided with five tension rollers that support the secondary transfer belt 102 on its inner surface.

More specifically, the five tension rollers include the secondary transfer roller 41, a separation roller 42, a driven roller 43, a drive roller 44, and an imbalance correction roller 45. The secondary transfer unit 40 also includes a tension roller 46 that presses the secondary transfer belt 102 from its outer circumferential surface.

The secondary transfer unit 40 according to the present embodiment is supported by the drawer housing 113 that serves as a unit support housing and can be drawn out from the housing toward the front side in the X-axis direction. FIG. 1 is a schematic front view of the printer, and the X-axis direction, the Y-axis direction, and the Z-axis direction illustrated in FIG. 1 are defined as follows. The X-axis direction is one of the front and rear directions of the printer toward the front, and the Y-axis direction is one of the right and left directions of the printer toward the right. The Z-direction is the upward vertical direction.

Figure 2A:
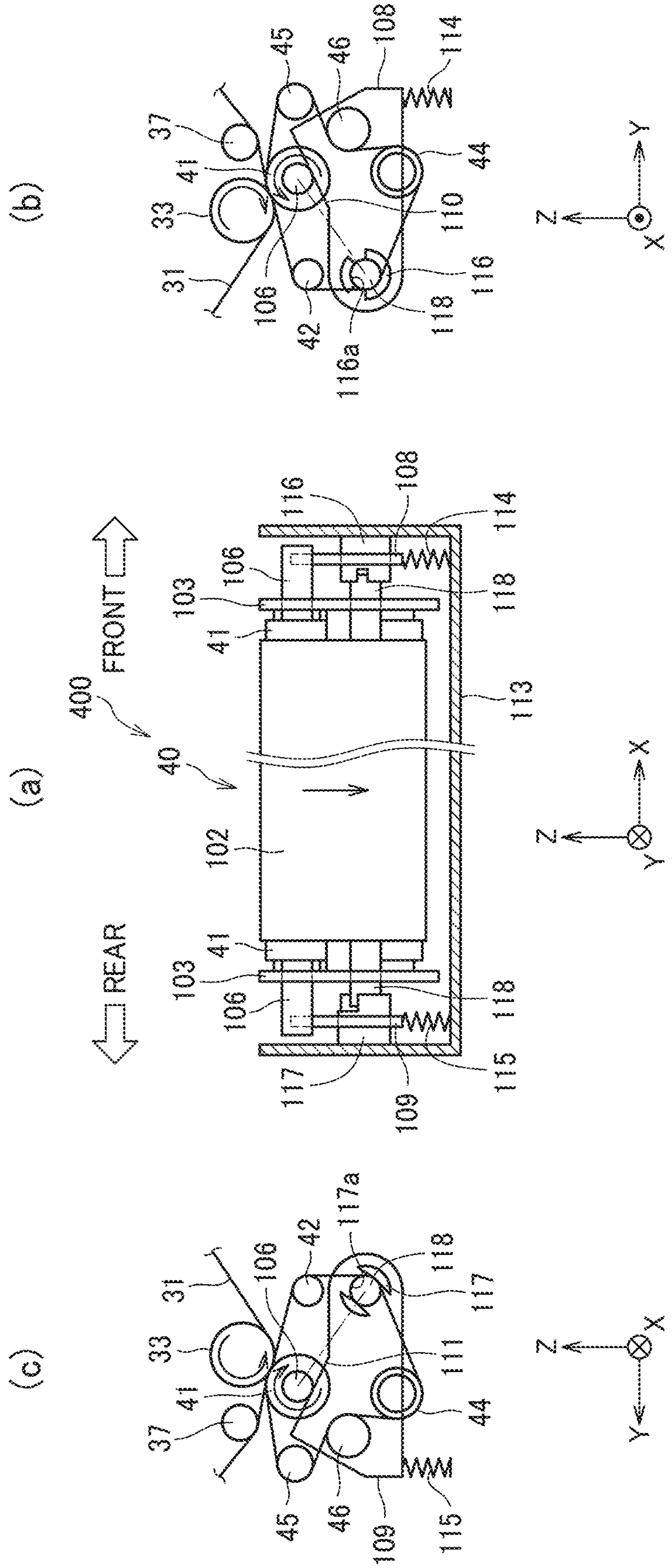
FIG. 2A is a schematic diagram of a secondary transfer device according to an embodiment of the present disclosure.

FIG. 2A is a schematic diagram of the secondary transfer device 400 according to the present embodiment.

The X-axis direction, the Y-axis direction, and the Z-axis direction in FIG. 2A are equivalent to those in FIG. 1.

(a) of FIG. 2A in the middle in the right and left directions is a side view of the secondary transfer unit 40 from the left side of the printer, according to the present embodiment. (b) of FIG. 2A on the right is a front view of the secondary transfer unit 40 from the front side of the printer, according to the present embodiment. (c) of FIG. 2A on the left is a rear view of the secondary transfer unit 40 from the rear side of the printer, according to the present embodiment. The secondary transfer unit 40 according to the present embodiment includes a pair of front and rear roller support plates 103 that support a plurality of tension rollers around which the secondary transfer belt 102 is looped.

The secondary transfer roller 41 according to the present embodiment, which forms the secondary transfer nip N2 (see FIG. 1) with the intermediate transfer belt 31, freely rotates around a secondary transfer roller shaft 106, which is a fixed shaft. The secondary transfer roller shaft 106 contacts a front rotary arm 108 and a rear rotary arm 109 that serve as a pair of biasing members through contact surfaces 110 and 111, and is pressed against the intermediate transfer belt 31 by the pressing forces applied by the front rotary arm 108 and the rear rotary arm 109.

The contact surface 110 and the contact surface 111 are approximately orthogonal to the vector that connects the center of the secondary transfer roller 41 and the center of the secondarily-transferring backside roller 33 that faces the secondary transfer roller 41 across the intermediate transfer belt 31. The contact surface 110 and the contact surface 111 function as reference planes used to position the secondary transfer unit 40.

The front rotary arm 108 and the rear rotary arm 109 are supported so as to rotate freely around the central axis by a pair of front and rear rotary shaft supports 116 and 117 that serve as a pair of support portions and are integrally formed with the drawer housing 113. Springs 114 and 115 that are arranged between the drawer housing 113 and the front rotary arm 108 and the rear rotary arm 109 bias the front rotary arm 108 and the rear rotary arm 109 to rotate on the axis. The front rotary arm 108 and the rear rotary arm 109 press the secondary transfer unit 40 against the intermediate transfer belt 31 through the contact surfaces 110 and 111, respectively.

As described above, the front rotary arm 108 and the rear rotary arm 109 that bias the secondary transfer unit 40 are arranged at the front end and rear end of the secondary transfer unit 40, and the front rotary arm 108 and the rear rotary arm 109 apply force in a direction where the secondary transfer unit 40 is pushed against the transfer unit 30. Accordingly, the secondary transfer unit 40 is held at four points in total that include two points of the front and rear rotary shaft supports 116 and 117 and two points of the contact surfaces 110 and 111 of the front rotary arm 108 and the rear rotary arm 109.

At the rear rotary shaft support 117 that is one of the above four points, the shaft 118 that serves as the supported portion of the secondary transfer unit 40 is supported by the trench 117*a*. Due to such a configuration, even if errors in the shape of, for example, the roller support plates 103 are present, such errors can be tolerated or absorbed by the trench 117*a*, and the secondary transfer unit 40 can be prevented from being twisted.

The front portion and the rear portion of the secondary transfer unit 40 are supported by front and rear rotary shaft supports 116 and 117. In the front rotary shaft support 116 that serves as the first support portion, a cylindrical hole 116*a* by which an end of the shaft 118 of the secondary transfer unit 40 on the front side is supported is formed. The front portion of the front rotary shaft support 116, which is one end in the axial direction, supports the shaft 118 and the front portion of the front rotary arm 108 such that the rotation center of the shaft 118 matches the rotation center of the front portion of the front rotary arm 108.

The front rotary shaft support 116 swingably supports the end of the shaft 118 of the secondary transfer unit 40 on the front side. The shaft 118 of the secondary transfer unit 40 is an irrotational axis whose both ends are supported by the pair of roller support plates 103, and rotatably supports the driven roller 43 illustrated in FIG. 1 between the pair of roller support plates 103.

In the rear rotary shaft support 117 that serves as the second support portion of the secondary transfer unit 40, the trench 117*a* in which the rear end of the shaft 118 of the secondary transfer unit 40 is engaged and supported is formed. A pair of side faces of the trench 117*a* has a round shape concentric with the center of the secondary transfer roller 41, and the trench 117*a* is formed in an arc shape around the secondary transfer roller 41. The rear end of the shaft 118 is supported by the trench 117*a* so as to be movable concentrically with the center of the secondary transfer roller 41.

Due to such configurations as described above, even if the position of the shaft 118 in the trench 117*a* is displaced, changes in the position of the secondary transfer roller 41 can be prevented. Accordingly, the shape of the secondary transfer nip N2 is not adversely affected by the displacements in the position of the shaft 118, and high image quality can be maintained.

The front rotary arm 108 and the rear rotary arm 109 are driven to rotate by separate pressure drivers, and the pressure of the front rotary arm 108 and the rear rotary arm 109 to the secondary transfer unit 40 can be adjusted by the multiple pressure drivers.

Figure 2B:
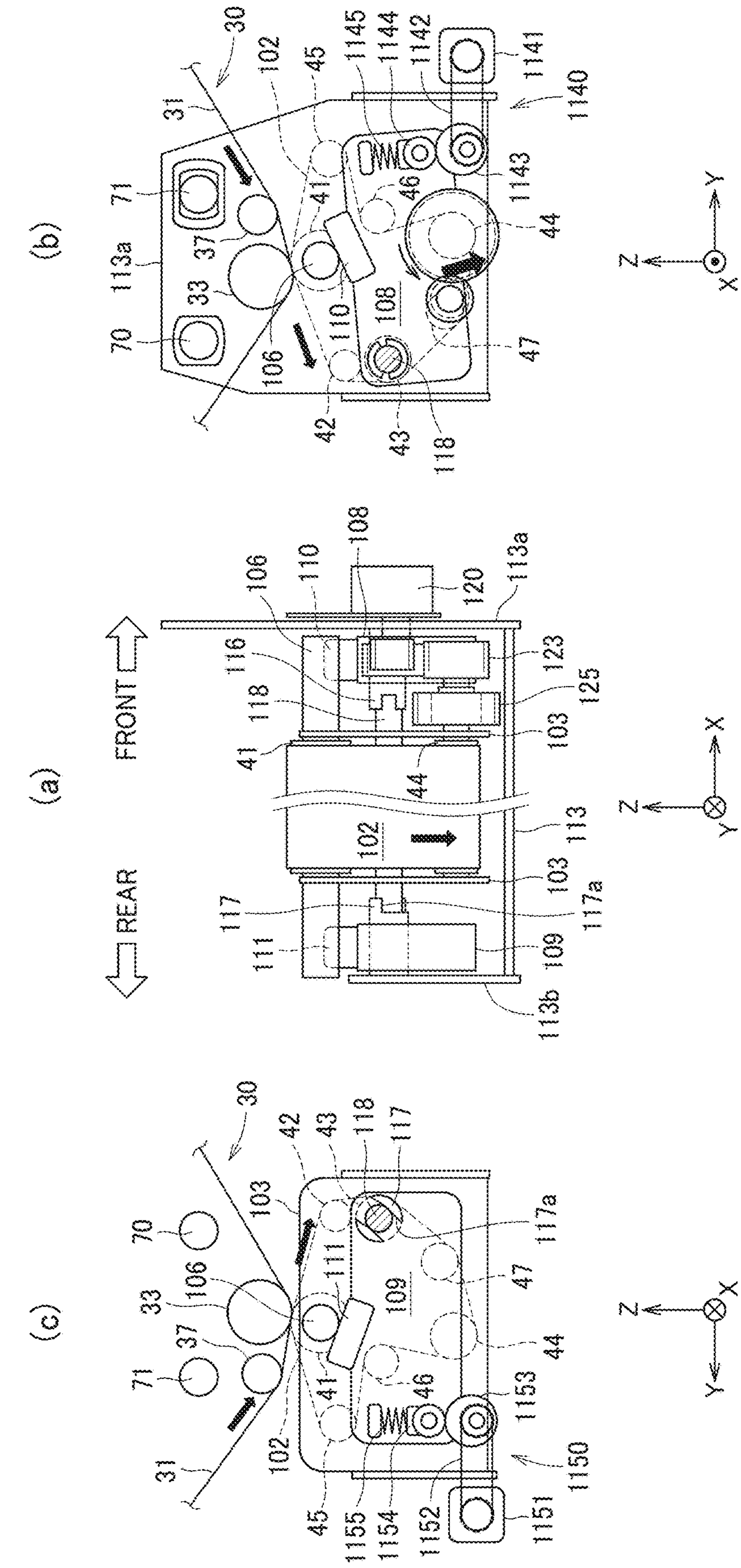
FIG. 2B is a schematic diagram of a secondary transfer device provided with a driver for a plurality of tension rollers, according to an embodiment of the present disclosure.

In FIG. 2A, the pressure drivers 1140 and 1150 are conceptually illustrated by springs 114 and 115. More specifically, the pressure drivers 1140 and 1150 are configured as illustrated in, for example, FIG. 2B. In other words, the pressure driver 1140 and the pressure driver 1150 in FIG. 2B are disposed at both ends of the secondary transfer unit 40 in the axial direction. The pressure driver 1140 is provided with a pressure motor 1141, a timing belt 1142, a pressure cam 1143, a cam follower 1144, and a return spring 1145.

The pressure driver 1150 is provided with a pressure motor 1151, a timing belt 1152, a pressure cam 1153, a cam follower 1154, and a return spring 1155.

The pair of roller support plates 103 are provided with a pair of pressure motors 1141 and 1151 and a pair of pressure cams 1143 and 1153. The timing belt 1142 is looped around the driving pulley of the pressure motor 1141 and the driven pulley of the pressure cam 1143, and the timing belt 1152 is looped around the driving pulley of the pressure motor 1151 and the driven pulley of the pressure cam 1153.

The cam follower 1144 is rotatably supported by the front rotary arm 108, and the cam follower 1154 is rotatably supported by the rear rotary arm 109. The base ends of the return springs 1145 and 1155 are fixed to the inner surface of the drawer housing 113. The tip end of the return spring 1145 biases the support shaft of the cam follower 1144 downward, and the tip end of the return spring 1155 biases the support shaft of the cam follower 1154 downward.

The pressure motors 1141 and 1151 are driven independently. By so doing, the cam followers 1144 and 1154 can be independently moved in the vertical directions in FIG. 2B. Due to such a configuration, the front rotary arm 108 and the rear rotary arm 109 can be independently rotated in the up and down directions in FIG. 2B around the front and rear rotary shaft supports 116 and 117.

Basically, FIG. 2A and FIG. 2B have the same structure or configuration. However, the total number of tension rollers that support the secondary transfer belt 102 on its inner surface is six in FIG. 2A while it is five in FIG. 2B. In other words, as a guide roller 47 is additionally arranged upstream from the drive roller 44 in FIG. 2B, the total number of tension rollers is greater in FIG. 2B by one compared with the total number of tension rollers in FIG. 2A.

In the present embodiment, various types of recording materials P may be used such as plain paper, thick paper, a postcard, an envelope, thin paper, coated paper, art paper, tracing paper, and a transparency for overhead projector (OHP). The optimum secondary-transfer pressure or the optimum pressure at the transfer nip varies depending on the type of the recording material P.

In order to handle such a situation, in the present embodiment, the secondary-transfer pressure is adjusted depending on the type of the recording material P. For example, an operation panel provided that is arranged on the housing of the printer is operated to input the information about the type of the recording material P set in the cassette 60.

The controller of the printer according to the present embodiment controls and determines the length of time during which the pressure motor 1141 and the pressure motor 1151 are driven to rotate by the multiple pressure drivers, based on the input information about the type of the recording material P. When the pressure motors 1141 and 1151 are stepping motors, the number of steps is determined based on the information about the type of the recording material P input from the operation panel.

As the pressure motor 1141 and the pressure motor 1151 are driven to rotate for the determined length of time or the determined number of steps, the pressure force of the front rotary arm 108 and the rear rotary arm 109 against the secondary transfer roller shaft 106 is adjusted to the pressing force suitable for the type of sheet. Due to such a configuration, the pressing force that is applied to the secondary transfer nip N2 is adjusted to the pressing force suitable for the type of sheet to achieve secondary-transfer pressure suitable for the type of sheet.

As will be described later in detail with reference to FIG. 7A-1, FIG. 7A-2, FIG. 7B-1, FIG. 7B-2, FIG. 8A-1, FIG. 8A-2, FIG. 8B-1, FIG. 8B-2, FIG. 9A-1, FIG. 9A-2, FIG. 9B-1, and FIG. 9B-2, one of the pressure motor 1141 or the pressure motor 1151 is driven to rotate more than the other in response to the twisted secondary transfer unit 40 under normal conditions. By so doing, the secondary transfer unit 40 is made inclined in the Z-direction with respect to the X-axis direction. As a result, the twist of the secondary transfer unit 40 is corrected, and the inclinations of the multiple rollers are optimized in relation to each other so as to prevent the belt imbalance. Moreover, the belt imbalance is prevented from deteriorating, and the speed at which the belt imbalance gets worsened can be maintained at a permissible level or below a permissible level.

A drive system that drives the tension rollers of the secondary transfer unit 40 is described below with reference to FIG. 2B and FIG. 3.

Figure 3:
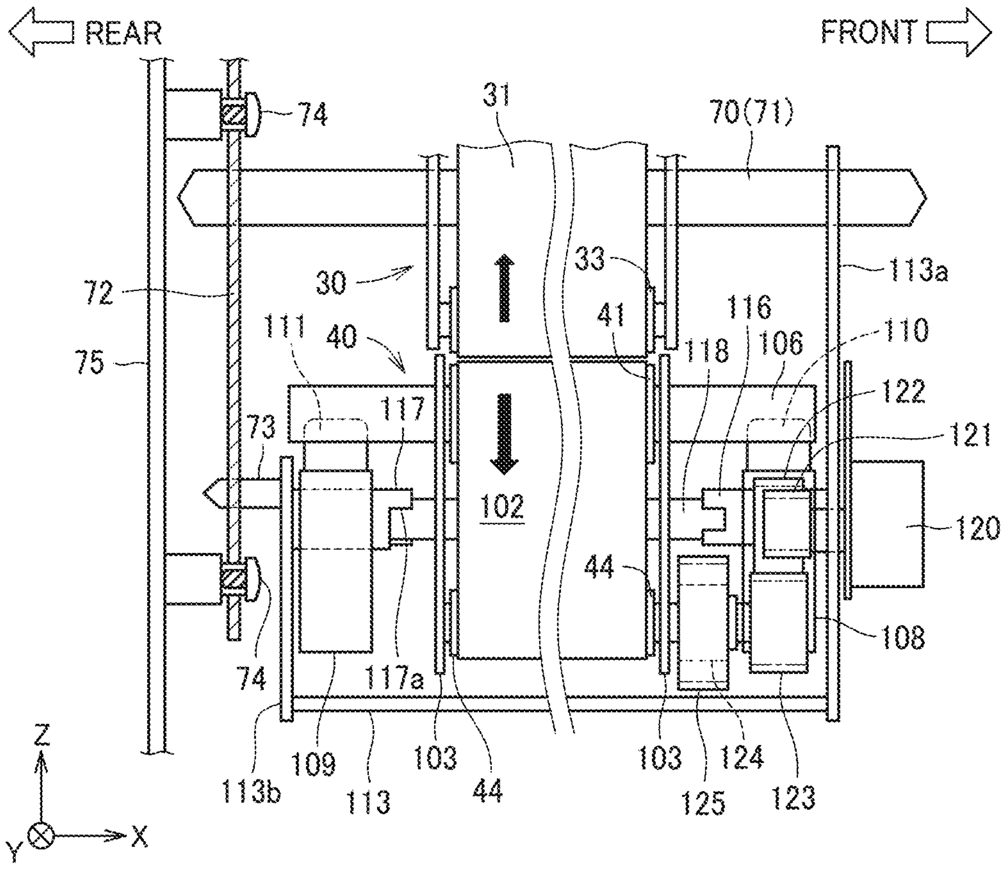
FIG. 3 is a diagram illustrating a drive system for a plurality of tension rollers, according to an embodiment of the present disclosure.

FIG. 3 is a diagram illustrating a drive system for the tension rollers, according to the present embodiment.

The drive roller 44 at the bottom among the six tension rollers illustrated in FIG. 2B is driven to rotate by the secondary transfer unit drive motor 120. As the secondary transfer belt 102 is provided with, for example, a toner-removing blade, the driving force of the secondary transfer belt 102 is insufficient when just passively driven by the friction with the intermediate transfer belt 31.

Under these circumstances, as illustrated in FIG. 3, the secondary transfer unit drive motor 120 is arranged outside the front plate 113*a* of the drawer housing 113. The secondary transfer unit drive motor 120 according to the present embodiment is provided with a drive gear 121, and the driving force of the drive gear 121 is conveyed to a coaxial gear 125 that serves as a driven portion of the drive roller 44, through a plurality of intermediate gears 122, 123, and 124.

The axes of those intermediate gears 122, 123, and 124 are supported by the front rotary arm 108. The intermediate gear 123 and the intermediate gear 124 are coaxially linked. The axis of the coaxial gear 125 is supported by the roller support plate 103 together with the drive roller 44.

As illustrated in FIG. 2B and FIG. 3, the position of the drawer housing 113 according to the present embodiment is determined with respect to a pair of right and left reference pins 70 and 71 that penetrate the transfer unit 30 in the front-rear direction parallel to the X-axis direction. These reference pins 70 and 71 are arranged near and above the secondarily-transferring backside roller 33, and the front plate 113*a* of the drawer housing 113 of the transfer unit 30 is positioned with respect to the front ends of the reference pins 70 and 71.

The rear ends of the reference pins 70 and 71 are positioned on a positioning plate 72 fixed to a housing 75 through a pair of fixation pins 74. A positioning pin 73 that is arranged on a rear panel 113*b* of the drawer housing 113 is fitted into a hole of the positioning plate 72.

Figure 4A:
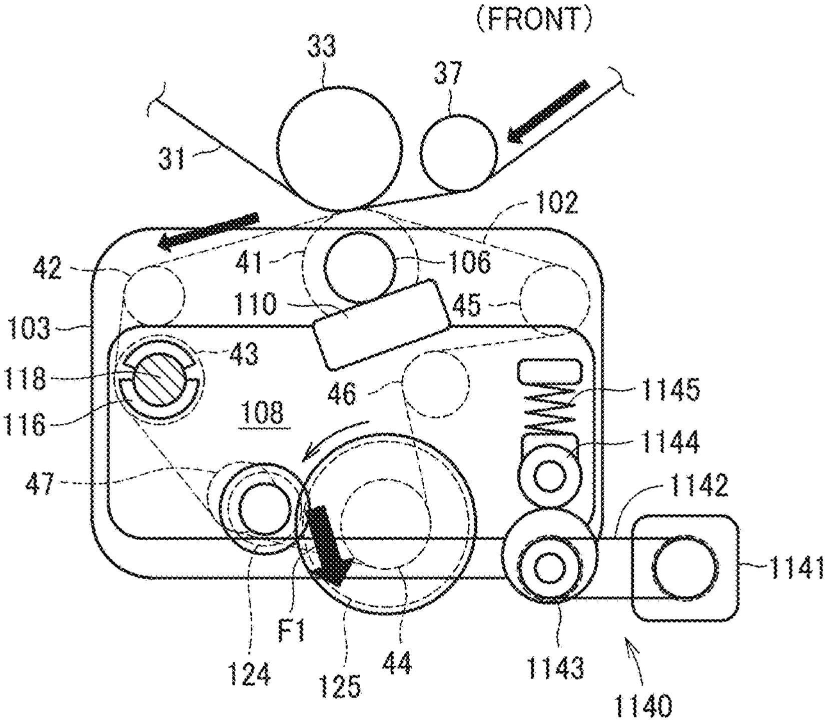
FIG. 4A is a diagram illustrating the directions of the forces generated at a drive gear unit when a drive system of a plurality of tension rollers is arranged at the front of a unit support housing, according to an embodiment of the present disclosure.
Figure 4B:
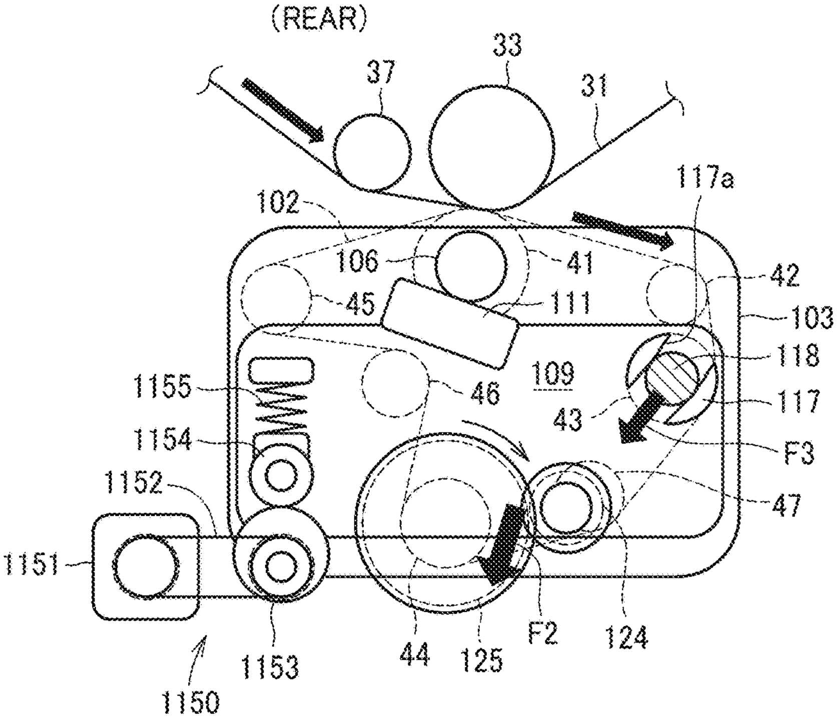
FIG. 4B is a diagram illustrating the directions of the forces generated at a drive gear unit when a drive system of a plurality of tension rollers is arranged at the rear of a unit support housing, according to an embodiment of the present disclosure.

FIG. 4A and FIG. 4B are diagrams to make a comparison between the direction of force F1 generated in the drive gear portion when the drive gear unit of the secondary transfer unit 40 is arranged at the front of the unit support housing and the direction of force F2 generated in the drive gear portion when the drive gear unit of the secondary transfer unit 40 is arranged at the rear of the unit support housing, according to the present embodiment.

As illustrated in FIG. 4A and FIG. 4B, the intermediate gear 124 that serves as a driver engages with the coaxial gear 125 of the drive roller 44.

In FIG. 4A, the intermediate gear 124 rotates in the clockwise direction. As a result, the coaxial gear 125 and the drive roller 44 rotate in the counterclockwise direction to drive the secondary transfer belt 102 to rotate in a counter-clockwise direction. Accordingly, the force F1 acts on the coaxial gear 125 in the direction of a downward arrow. This force F1 causes a clockwise turning moment that acts on the front roller support plate 103 around the front rotary shaft support 116.

This clockwise turning moment causes force that presses the front ends of the secondary transfer roller 41 and the other tension rollers downward. However, the center of rotation of the front roller support plate 103 is determined by the front rotary shaft support 116, and the front end of the secondary transfer roller 41 is restricted by the contact surface 110 of the front rotary arm 108. Due to such a configuration, the front roller support plate 103 is not displaced due to the clockwise turning moment in the clockwise direction, and the relation among the inclinations of the multiple tension rollers is not lost.

By contrast, as illustrated in FIG. 4B, when the drive gear unit of the secondary transfer unit 40 is arranged at the rear of the unit support housing, the rear end of the shaft 118 of the secondary transfer unit 40 may be shifted in a direction F3 due to the direction of force F2 generated in the drive gear portion. In other words, the direction of the force F2 is substantially the same as a direction in which the posture or attitude of the secondary transfer unit 40 that serves as the belt unit is not restricted. As described above, the rear end of the shaft 118 is supported by the trench 117*a* of the rear rotary shaft support 117 in a movable manner to buffer the errors in the shape of, for example, the roller support plates 103. For this reason, the rear end of the shaft 118 may be displaced along the trench 117*a*. In other words, the rear end of the shaft 118 may be displaced in an arc-shaped direction around the secondary transfer roller 41, which is indicated by an arrow F3 in FIG. 4B.

As illustrated in FIG. 4B, even when the drive gear unit of the secondary transfer unit 40 is arranged at the rear of the unit support housing, the rear end of the shaft 118 of the secondary transfer unit 40 is not shifted in the direction F3 as long as the direction of the force F2 is, for example, the direction orthogonal to the direction F3 that is different from a direction in which the posture or attitude of the secondary transfer unit 40 that serves as the belt unit is not restricted.

Figure 5:
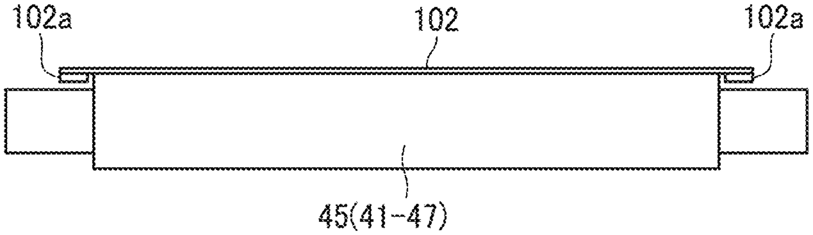
FIG. 5 is a diagram illustrating a secondary transfer belt that has a pair of imbalance correction guides, according to an embodiment of the present disclosure.

In such cases, the relation among the inclinations of the multiple tension rollers may be lost. Moreover, the belt imbalance may deteriorate, and the speed at which the belt imbalance gets worsened may exceed a permissible value. As a result, a pair of imbalance correction guides 102*a* at both ends of the secondary transfer belt 102 as illustrated in FIG. 5 may strongly hit the restricting member of the imbalance correction roller 45, and may wear out at an early stage. Moreover, the secondary transfer belt 102 may be broken or damaged. For the above reasons, as illustrated in FIG. 4A, it is desired that the drive gear unit of the secondary transfer unit 40 be arranged on the side where the shaft 118 is aligned at a fixed position.

In the present embodiment, the front rotary arm 108 and the rear rotary arm 109 are rotatably attached to the front and rear rotary shaft supports 116 and 117, respectively, that support the secondary transfer unit 40. Due to such a configuration, the rotation center of the secondary transfer unit 40 approximately matches the rotation centers of the front rotary arm 108 and the rear rotary arm 109, and changes in the pressing position of the secondary transfer roller shaft 106 on the contact surfaces 110 and 111 of the front rotary arm 108 and the rear rotary arm 109 due to the adjustment of the pressing force by the pressure cams 1143 and 1153 can be reduced. In other words, changes in the pressing position of the secondary transfer roller shaft 106 on the contact surfaces 110 and 111 of the front rotary arm 108 and the rear rotary arm 109 due to the rotation of the front rotary arm 108 and the rear rotary arm 109 around the front and rear rotary shaft supports 116 and 117 can be reduced.

Due to such configurations as described above, irregularities in the relation between the pressing force by the pressure cams 1143 and 1153 and the positions around which the front rotary arm 108 and the rear rotary arm 109 rotate can be prevented, and the pressing force can be easily adjusted. In particular, the rotation center of the secondary transfer unit 40 matches the rotation center of the front rotary arm 108 as the front portion of the shaft 118 is inserted into the cylindrical hole 116*a* arranged at the axial center of the front rotary shaft support 116. Due to such a configuration, on the front side, the irregularities in the relation between the pressing force by the pressure cams 1143 and the rotational position of the front rotary arm 108 can be reduced as desired, and the pressing force can be easily adjusted.

By making the rotation center of the secondary transfer unit 40 substantially match the rotation centers of the front rotary arm 108 and the rear rotary arm 109, the transfer device can be downsized. In other words, when the rotation center of the front rotary arm 108 and the rear rotary arm 109 is outside the region of the secondary transfer unit 40, the sizes of the front rotary arm 108 and the rear rotary arm 109 need to be increased. This leads to an unwanted increase in the size of the transfer device.

In the present embodiment, while the end of the shaft 118 of the secondary transfer unit 40 on the front side is swingably supported, the rear end of the shaft 118 of the secondary transfer unit 40 is supported so as to be movable concentrically with the center of the secondary transfer roller 41. Due to such a configuration, the secondary transfer unit 40 is supported by the drawer housing 113 without restricting the posture or attitude of the secondary transfer belt 102 at the secondary transfer nip N2 in the moving direction parallel to the Y-axis direction. Accordingly, the secondary transfer unit 40 can be supported when the posture or attitude of the secondary transfer unit 40 is inclined in the apparatus in the Z-axis direction with respect to the X-axis direction.

The drawer housing 113 supports only the shaft 118 of the secondary transfer unit 40. The secondary transfer unit 40 is supported by the drawer housing 113 while the posture or attitude of the secondary transfer unit 40 with respect to the X-axis direction is not restricted, and the secondary transfer unit 40 rotates on the shaft 118.

Due to, for example, manufacturing errors, there are some cases in which the secondary transfer unit 40 according to the present embodiment is twisted on its own under normal conditions before the belt unit is set in the unit support housing or the drawer housing 113. In such cases, the posture of the front roller support plate 103 in the X-axis direction and the posture of the rear roller support plate 103 in the X-axis direction are different from each other. As a result, the multiple rollers around which the secondary transfer belt 102 supported by those roller support plates 103 is looped may be inclined with respect to the X-axis direction, and the secondary transfer belt 102 may be shifted to one side in the X-axis direction while the secondary transfer belt 102 is rotating. Such a shift to one side may be referred to as belt imbalance in the following description.

In order to handle such a situation, in the present embodiment, the inclination of one of the multiple rollers around which the secondary transfer belt 102 is looped with respect to the X-axis direction can be adjusted. By adjusting the inclination of each one of the rollers with respect to the X-axis direction, the imbalance of the secondary transfer belt 102 due to the twist of the secondary transfer unit 40 under normal conditions is reduced.

Figure 6:
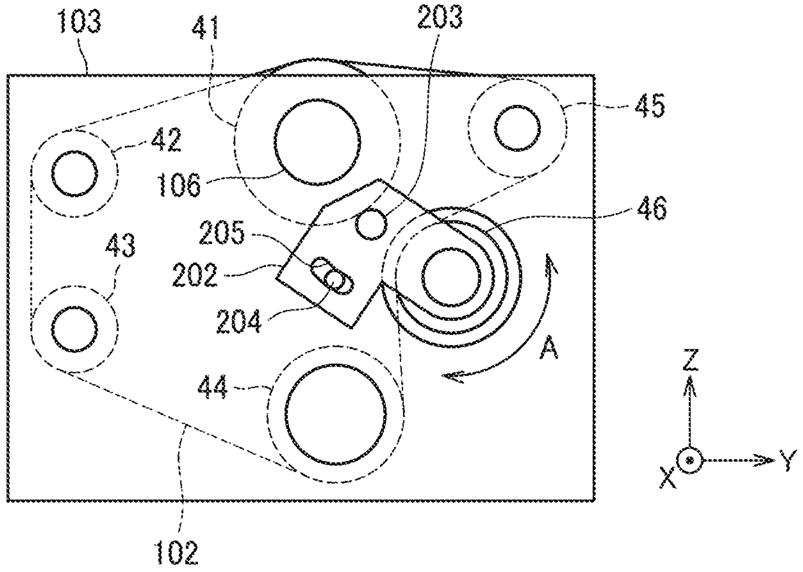
FIG. 6 is a diagram illustrating how the inclination of each roller is adjusted, according to an embodiment of the present disclosure.

FIG. 6 is a diagram illustrating how the inclination of each roller is adjusted, according to the present embodiment.

In the present embodiment, the inclination of the tension roller 46 can be adjusted, and the front portion of the tension roller 46 is supported by the front roller support plate 103 through an inclination adjuster 202. A roller other than the tension roller 46 may be a roller whose inclination can be adjusted.

The inclination adjuster 202 according to the present embodiment is rotatably supported by a pin 203 that is arranged on the front roller support plate 103. The inclination adjuster 202 according to the present embodiment is provided with a round screw insertion slot 205 around the pin 203, i.e., the rotation center of the inclination adjuster 202.

As the inclination adjuster 202 is driven to rotate around the pin 203, the front portion of the tension roller 46 moves in the directions indicated by an arrow A in FIG. 6, and the inclination of the tension roller 46 with respect to the X-axis direction (axial direction) is adjusted. For example, when the secondary transfer belt 102 is shifted to the rear side due to the torsion of the secondary transfer unit 40 under normal conditions, the inclination of the tension roller 46 with respect to the X-axis direction is adjusted at the portion where the secondary transfer belt 102 is looped over the tension roller 46 such that the secondary transfer belt 102 is shifted to the front side.

After the inclination adjustment is completed, the inclination adjuster 202 is fastened to the front roller support plate 103 using a screw 204. Due to such a configuration, the belt imbalance of the secondary transfer belt 102 due to the twist of the secondary transfer unit 40 under normal conditions is reduced.

In a case where the pair of front and rear rotary shaft supports 116 and 117 do not restrict the posture or attitude of the secondary transfer unit 40 with respect to the X-axis direction while the shaft 118 is supported so as not to be movable on the YZ plane and the secondary transfer unit 40 is attached to the drawer housing 113, technical problems occur as follows. In other words, the secondary transfer unit 40 that is twisted under normal conditions is further twisted in an undesired manner when the front rotary arm 108 and the rear rotary arm 109 make the secondary transfer roller 41 contact the intermediate transfer belt 31 or the secondarily-transferring backside roller 33 through the secondary transfer belt 102.

As a result, the relation among the inclinations of the multiple rollers whose belt imbalance is prevented or adjusted by the inclination adjuster 202 is lost, and the belt imbalance of the secondary transfer belt 102 gets worse. As a result, the speed at which the belt imbalance gets worsened exceeds a permissible value. Moreover, the pair of imbalance correction guides 102*a* at both ends of the secondary transfer belt 102 as illustrated in FIG. 5 may strongly hit the restricting member of the imbalance correction roller 45, and may wear out at an early stage. As a result, the secondary transfer belt 102 may be damaged.

By contrast, in the present embodiment, the secondary transfer unit 40 is supported without restricting the posture or attitude of the secondary transfer unit 40 in the Y-axis direction while the shaft 118 is supported and the secondary transfer unit 40 is attached to the drawer housing 113. In other words, the front rotary shaft support 116 swingably supports the end of the shaft 118 on the front side, and the rear end of the shaft 118 is supported by the rear rotary shaft support 117 in a movable manner around the center of the secondary transfer roller shaft 106.

Due to such a configuration, the secondary transfer unit 40 is supported without restricting the posture or attitude of the secondary transfer unit 40 with respect to the Y-axis direction, and the secondary transfer unit 40 that is inclined in the X-axis direction with respect to the X-axis direction can be supported by the drawer housing 113. Accordingly, the torsion stress when the secondary transfer roller 41 contacts the intermediate transfer belt 31 by the operation of the front rotary arm 108 and the rear rotary arm 109 can be reduced. Moreover, the belt imbalance can be prevented from deteriorating, and the speed at which the belt imbalance gets worsened can be prevented from exceeding a permissible value. Some embodiments of the present disclosure are described below in detail with reference to the drawings.

FIG. 7A-1, FIG. 7A-2, FIG. 7B-1, and FIG. 7B-2 are diagrams illustrating how the secondary transfer unit 40 that is twisted under normal conditions is attached to the drawer housing 113, according to the present embodiment.

The solid lines and the broken lines in FIG. 7A-1, FIG. 7A-2, FIG. 7B-1, and FIG. 7B-2 indicate a front portion and a rear portion, respectively.

Figures 1, 7A:
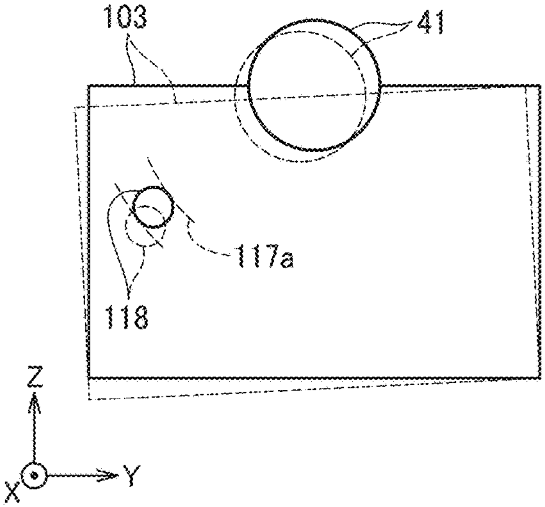
Figures 1, 7B:
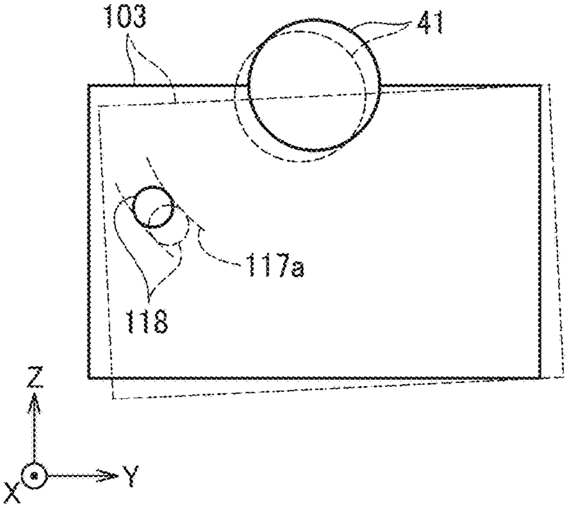
Figures 2, 7A:
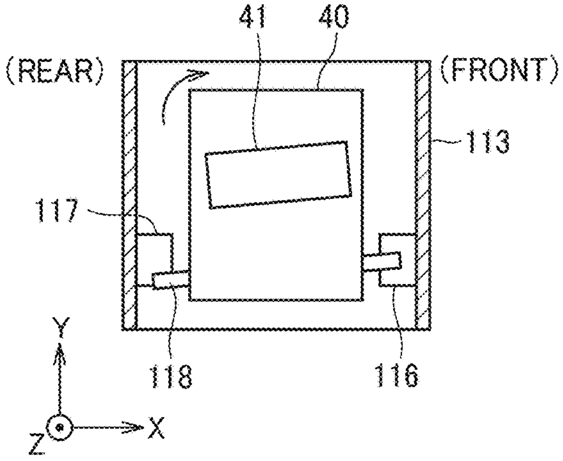
Figures 2, 7B:
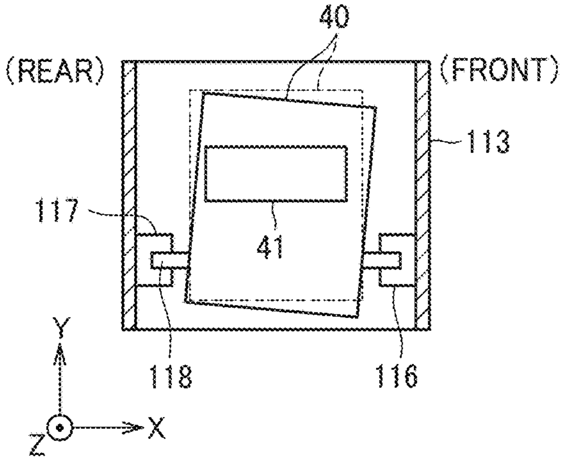
Figures 1, 8A:
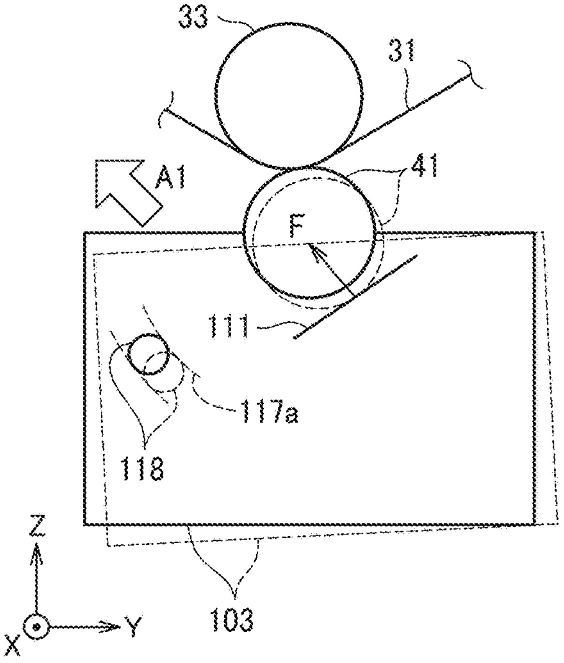

For example, as illustrated in FIG. 8A-1 and FIG. 8A-2, when the secondary transfer unit 40 is not inclined in any one of the X-direction, the Y-direction, and the Z-direction as the secondary transfer unit 40 is twisted, the positions of the front portion and rear portion of the shaft 118 are shifted. As a result, as illustrated in FIG. 8A-1 and FIG. 8A-2, without appropriate treatment or adjustment, the rear portion of the shaft 118 cannot be inserted into the trench 117*a* of the rear rotary shaft support 117 while the front portion of the shaft 118 is supported by the front rotary shaft support 116.

In the present embodiment, the front portion of the shaft 118 is swingably supported with respect to the front rotary shaft support 116. Due to such a configuration, as illustrated in FIG. 7B-1 and FIG. 7B-2, the secondary transfer unit 40 can be inclined in the Y-axis direction with respect to the X-axis direction and can be attached to the drawer housing 113. As the secondary transfer unit 40 is inclined as above in the Y-axis direction with respect to the X-axis direction, the rear portion of the shaft 118 can be inserted into the trench 117*a* of the rear rotary shaft support 117, and the secondary transfer unit 40 that is twisted can be attached to and supported by the drawer housing 113.

FIG. 8A-1, FIG. 8A-2, FIG. 8B-1, and FIG. 8B-2 are diagrams illustrating how the secondary transfer roller 41 of the secondary transfer unit 40, which is twisted under normal conditions, contacts the intermediate transfer belt 31, according to the present embodiment.

As illustrated in FIG. 8A-1 and FIG. 8A-2, due to the twist of the secondary transfer unit 40, the rear portion of the secondary transfer roller 41 indicated by broken lines in FIG. 8A-1 may be positioned lower than the front portion of the secondary transfer roller 41 indicated by solid lines in FIG. 8A-1 and FIG. 8A-2. In such cases, the front portion of the secondary transfer roller 41 contacts the intermediate transfer belt 31 earlier than the rear portion of the secondary transfer roller 41.

As described above, according to the present embodiment, the front rotary arm 108 and the rear rotary arm 109 are driven to rotate independently by different pressure drivers, i.e., the pressure motor 1141 and the pressure motor 1151 in FIG. 2B. Due to such a configuration, when the front portion of the secondary transfer roller 41 contacts the intermediate transfer belt 31, the front portion of the front rotary arm 108 stops rotating, and only the rear portion of the rear rotary arm 109 continues rotating.

In view of these circumstances, when the posture or attitude of the secondary transfer unit 40 in the Y-axis direction is restricted and the secondary transfer unit 40 is supported by the drawer housing 113, the rear portion of the secondary transfer roller 41 rotates on the shaft 118 in the X-axis direction. As a result, the twist of the secondary transfer unit 40 may change, and the relation among the inclinations of the multiple rollers may be lost. Moreover, the belt imbalance may deteriorate, and the speed at which the belt imbalance gets worsened may exceed a permissible value. As a result, the pair of imbalance correction guides 102*a* at both ends of the secondary transfer belt 102 may strongly hit the restricting member of the imbalance correction roller 45, and may wear out at an early stage. As a result, the secondary transfer belt 102 may be damaged.

By contrast, in the present embodiment, the front portion of the shaft 118 is swingably supported, and the rear portion of the shaft 118 is supported so as to be movable concentrically with the rotation center of the secondary transfer roller 41. Due to such supporting of the shaft 118, the secondary transfer unit 40 can be supported without restricting the posture or attitude of the secondary transfer unit 40 in the Y-axis direction.

Figures 1, 8B:
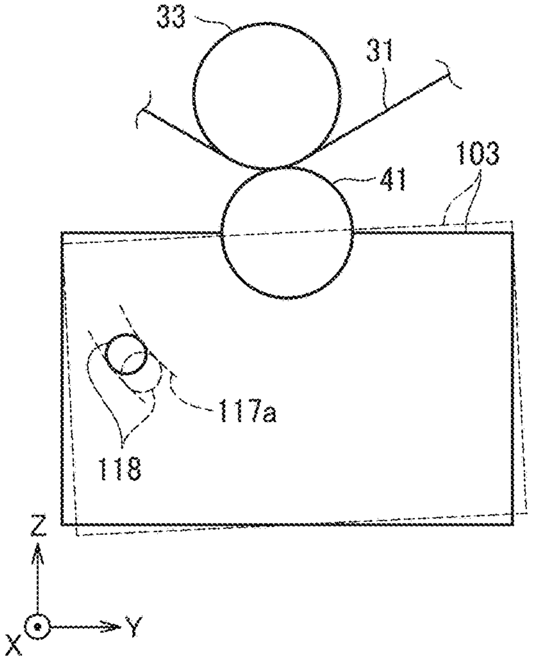
Figures 2, 8A:
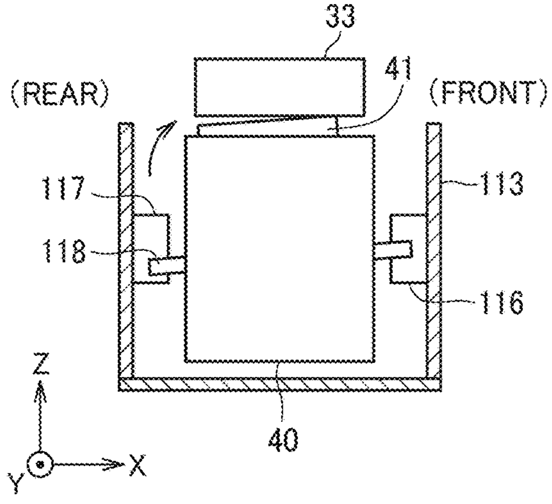
Figures 2, 8B:
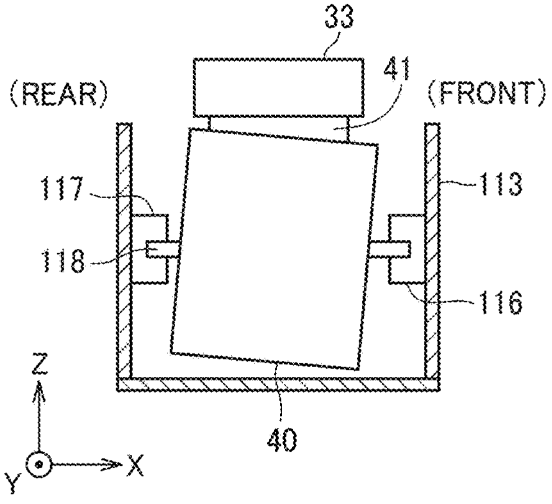

Accordingly, after the front portion of the secondary transfer roller 41 contacts the intermediate transfer belt 31, the posture or attitude of the secondary transfer unit 40 in the Y-axis direction changes in such a manner that the entire rear portion of the secondary transfer unit 40 is lifted by the pressing force of the rear rotary arm 109 in the direction indicated by an arrow A1 in FIG. 8A-1. Due to such a configuration, as illustrated in FIG. 8B-2, the posture or attitude of the secondary transfer unit 40 is inclined in the Z-axis direction with respect to the X-axis direction, and the entirety of the secondary transfer roller 41 in the X-axis direction contacts the intermediate transfer belt 31.

As described above, the secondary transfer unit 40 is merely inclined in the Z-direction with respect to the X-axis direction, and the twist of the secondary transfer unit 40 hardly changes from the normal conditions. Accordingly, the inclinations of the multiple rollers can be optimized in relation to each other so as to prevent the belt imbalance, and the belt imbalance can be prevented from deteriorating, and the speed at which the belt imbalance gets worsened can be maintained at a permissible level or below a permissible level.

FIG. 9A-1, FIG. 9A-2, FIG. 9B-1, and FIG. 9B-2 are diagrams illustrating cases where a rear portion of the secondary transfer roller 41 is positioned higher than a front portion of the secondary transfer roller 41 when the secondary transfer unit 40 is twisted under normal conditions, according to the present embodiment.

Figures 1, 9A:
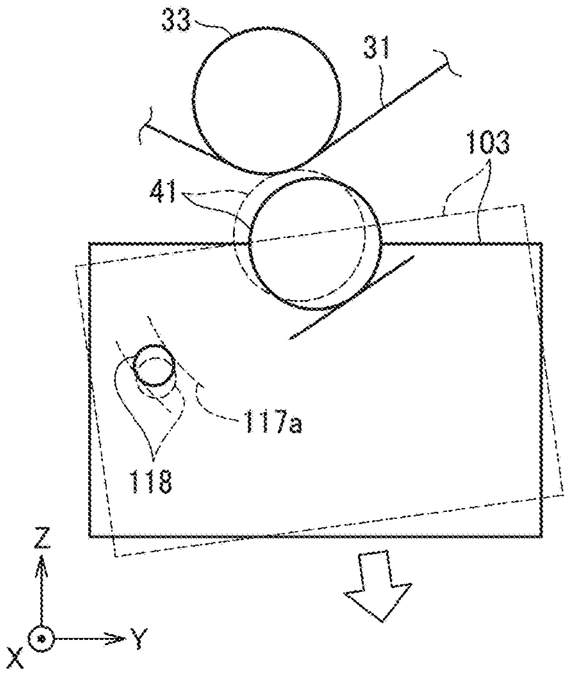

As illustrated in FIG. 9A-1 and FIG. 9A-2, when a rear portion of the secondary transfer roller 41 is positioned higher than a front portion of the secondary transfer roller 41 when the secondary transfer unit 40 is twisted under normal conditions, such a rear portion of the secondary transfer roller 41 indicated by broken lines in FIG. 9A-1 contacts the intermediate transfer belt 31 earlier than the front portion of the secondary transfer roller 41 indicated by a solid line in FIG. 9A-1.

After the rear portion of the secondary transfer roller 41 contacts the intermediate transfer belt 31, the rotation of the front rotary arm 108 on the front portion is continued such that the front portion of the secondary transfer roller 41 contacts the intermediate transfer belt 31. By so doing, the front portion of the secondary transfer roller 41 rotates about the shaft 118 in a counterclockwise direction in FIG. 9A-1. Accordingly, the secondary transfer unit 40 is driven to rotate in a counterclockwise direction as indicated by the arrow in FIG. 9A-2 by the reflection force from the intermediate transfer belt 31 or the secondarily-transferring backside roller 33.

Figures 1, 9B:
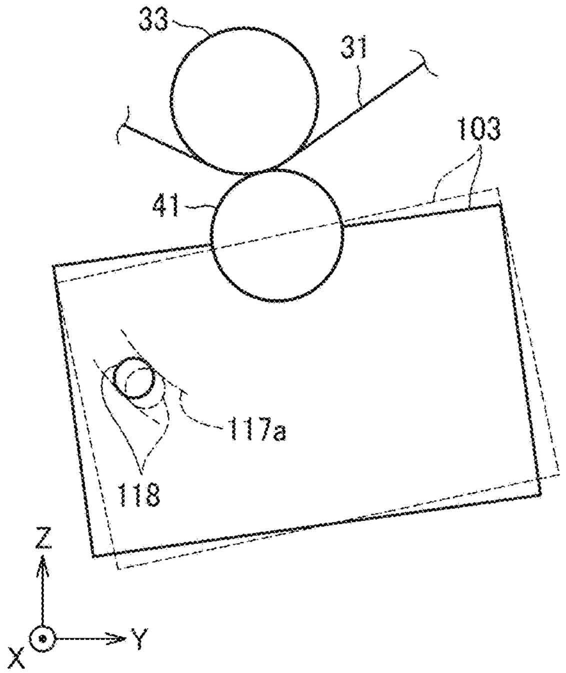
Figures 2, 9A:
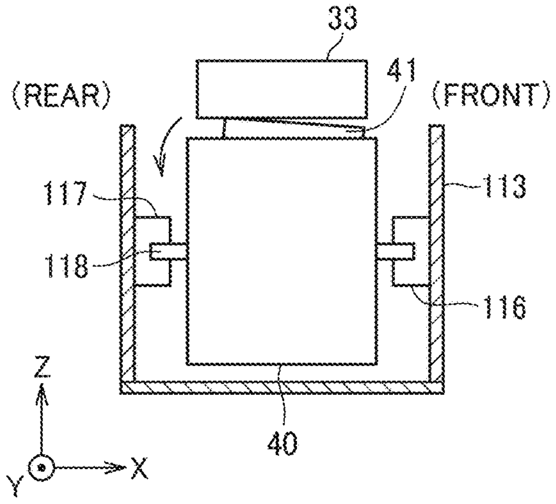
Figures 2, 9B:
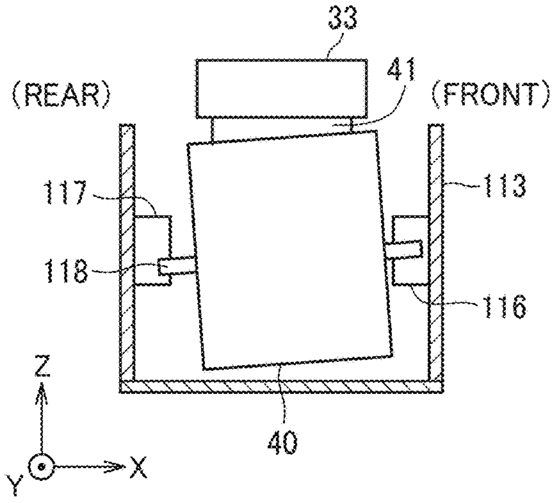

In other words, the secondary transfer unit 40 changes its posture around the Y-axis direction. As a result, as illustrated in FIG. 9B-1 and FIG. 9B-2, when the front portion of the secondary transfer roller 41 contacts the intermediate transfer belt 31, the secondary transfer unit 40 is inclined with respect to the drawer housing 113 such that the rear portion of the secondary transfer unit 40 is positioned lower than the front portion of the secondary transfer unit 40.

As described above, even when the secondary transfer unit 40 is twisted in such a manner that a rear portion of the secondary transfer roller 41 is positioned higher than a front portion of the secondary transfer roller 41, the posture of the secondary transfer unit 40 about the Y-axis direction is changed with respect to the drawer housing 113, and the secondary transfer roller 41 contacts the intermediate transfer belt 31 in its entirety. Due to such a configuration, the inclinations of the multiple rollers are optimized in relation to each other so as to prevent the belt imbalance, and the belt imbalance can be prevented from deteriorating.

The trench 117*a* is a trench that extends in the up and down directions parallel to the Z-axis direction. If the trench 117*a* is a trench that extends in the up and down directions, the posture or attitude of the secondary transfer unit 40 in the Y-axis direction is not restricted. As a result, the posture or attitude of the secondary transfer unit 40 in the Y-axis direction changes when the entirety of the secondary transfer roller 41 in the X-axis direction contacts the intermediate transfer belt 31 to form the secondary transfer nip, and the twist of the secondary transfer unit 40 can be prevented from changing from the normal conditions.

However, if the trench 117*a* has a shape extending in a direction substantially parallel to a pressing direction F in which the front rotary arm 108 and the rear rotary arm 109 press the belt unit, the rear portion of the secondary transfer roller 41 can be smoothly moved in the up and down directions, and the twist of the secondary transfer unit 40 can preferably be prevented from changing from the normal conditions. Compared with a trench that extends in the up and down directions parallel to the Z-axis direction, the positional displacement between the front portion and the rear portion of the secondary transfer roller 41 in the Y-axis direction when the rear portion of the secondary transfer roller 41 contacts the intermediate transfer belt 31 can be reduced.

Due to such a configuration, the displacement of the contact surface 111 of the rear rotary arm 109 contacts the secondary transfer roller shaft 106 with respect to the pressing position at which the contact surface 110 of the front rotary arm 108 contacts the secondary transfer roller shaft 106 can be reduced. Due to such a configuration, the difference between the pressing force applied from the front rotary arm and the pressing force applied from the rear rotary arm can be reduced. Accordingly, the changes in the pressure at the second transfer nip can be reduced, and transferability can be achieved as desired.

Further, as the trench 117*a* is formed in an arc shape around the rotation center of the secondary transfer roller 41 in the present embodiment, the positional displacement between the front portion and the rear portion of the secondary transfer roller 41 in the Y-axis direction when the secondary transfer roller 41 contacts the intermediate transfer belt 31 can further be reduced. Accordingly, the changes in the pressure at the transfer nip can further be reduced.

Some aspects of the present disclosure are described below.

First Aspect

A transfer device includes a belt unit having a transfer belt looped around a plurality of tension rollers including a transfer roller, a unit support housing including a first support portion to support one end of the belt unit rotatably in an axial direction, and a second support portion to support another end of the belt unit rotatably in the axial direction, the unit support housing supporting the belt unit through the first support portion and the second support portion around a moving direction of the transfer belt, a biasing member including a pair of biasing members, one of the pair of biasing members being rotatably supported by the first support portion and pressing one end of each one of the plurality of tension rollers of the belt unit in an axial direction, another one of the pair of biasing members being rotatably supported by the second support portion and pressing another end of each one of the plurality of tension rollers of the belt unit in the axial direction, the transfer roller contacting an image bearer through the transfer belt to form a transfer nip, the second support portion having a trench into which a supported portion of the another end of the belt unit in the axial direction is inserted, the supported portion having a degree of freedom in a pressing direction where the pair of biasing members press the belt unit when the transfer nip is formed, the unit support housing supporting the belt unit without restricting a posture of the belt unit around the moving direction of the transfer belt at the transfer nip, and a driver disposed to rotate to generate rotary driving force to be conveyed to a driven portion provided for one of the plurality of tension rollers, the rotary driving force of the driver acting in a direction different from a direction in which the posture of the belt unit is not restricted.

Second Aspect

In the transfer device according to the first aspect, the driver is disposed on one side of the belt unit in the axial direction.

Third Aspect

In the transfer device according to the first aspect or the second aspect, the first support portion has a hole into which one end of the supported portion of the belt unit in the axial direction is inserted, and the hole determines a position of the one end of the supported portion with respect to the unit support housing.

Fourth Aspect

In the transfer device according to any one of the first to third aspects, the trench has an arc shape around a rotation center of the transfer roller.

Fifth Aspect

In the transfer device according to any one of the first to fourth aspects, one of the plurality of tension rollers has an inclination adjustable with respect to the axial direction.

Sixth Aspect

In the transfer device according to any one of the first to fifth aspects, the transfer belt is a secondary transfer belt.

Seventh Aspect

In an image forming apparatus including a transfer device, the transfer device according to any one of the first to sixth aspects is used as the transfer device.

Eighth Aspect

A transfer device such as the secondary transfer device includes a belt unit such as the secondary transfer unit 40 having a transfer belt such as the secondary transfer belt 102 looped around a plurality of tension rollers including a transfer roller such as the secondary transfer roller 41, a unit support housing such as the drawer housing 113 that rotatably supports the belt unit, and a biasing member that presses the belt unit. As the belt unit is pressed by the biasing member, the transfer roller contacts an image bearer such as the intermediate transfer belt 31 through the transfer belt to form a transfer nip. In the transfer device according to the eighth aspect, the biasing member has a pair of biasing members such as the pair of front rotary arm 108 and the rear rotary arm 109, and one of the pair of biasing members presses one end such as a front portion of each one of the plurality of tension rollers of the belt unit in an axial direction. In the transfer device according to the eighth aspect, another one of the pair of biasing members presses another end such as a rear portion of each one of the plurality of tension rollers of the belt unit in the axial direction, and the unit support housing supports the belt unit without restricting the posture of the belt unit around the moving direction of the transfer belt at the transfer nip. In the above embodiments of the present disclosure, the moving direction of the transfer belt is parallel to the Y-axis direction.

Due to, for example, manufacturing errors, there are some cases in which the belt unit that supports the multiple tension rollers is twisted on its own under normal conditions before being set in the unit support housing. As the belt unit is twisted, belt imbalance may occur. More specifically, as the belt unit is twisted, some of the transfer roller and the multiple tension rollers may be inclined with reference to the axial direction, and the transfer belt may be shifted to one side in the axial direction while the transfer belt is rotating. In order to deal with such a situation, the inclination of at least one of the multiple tension rollers with respect to the axial direction is adjusted to prevent the belt imbalance of the belt unit due to the twist under normal conditions. When the belt unit is twisted under normal conditions, the posture or attitude around the axial direction of a side panel of the belt unit on one side in the axial direction is different from the posture or attitude around the axial direction of a side panel of the belt unit on another side in the axial direction, where the side panel of the belt unit on one side supports one end of some of the multiple tension rollers and the side panel of the belt unit supports the other end of some of the multiple tension rollers. Accordingly, a pair of positions at which the transfer belt contacts and presses an image bearer are different from each other between a pair of portions of the transfer roller on one side and the other side in the axial direction. When both sides of the belt unit in the axial direction are pressed by the pair of biasing members to press the transfer belt against an image bearer, one of the pair of portions of the transfer belt on one side and the other side in the axial direction, which is closer to the image carrier than the other, contacts the image bearer, and then the other one of the pair of portions of the transfer belt, which is farther from the image carrier than the other, contacts the image bearer. Such a side closer to the image carrier than the other may be referred to as a close side, and such a side further from the image carrier than the other may be referred to as a far side in the following description. In so doing, the unit support housing restricts the posture or attitude of the belt unit around the moving direction of the transfer belt at the transfer nip. When the belt unit is supported so as not to be inclined with respect to the axial direction and is viewed in the moving direction of the transfer belt, firstly, the close side of the transfer belt contacts the image carrier. Then, while twisting the belt unit by the pressing force of one of the pair of pressure members on the far side of the transfer belt, the far side of the transfer belt of the belt unit rotates using the supporting units of the belt unit as fixed point, which are integrally formed with the unit support housing, and the far side of the transfer belt contacts the image carrier. As a result, the twist of the belt unit is changed from the twist under normal conditions. Under these circumstances, the relation among the inclinations of the transfer roller and the multiple tension rollers may be lost, and the speed at which the belt imbalance of the transfer belt may exceed a permissible value.

By contrast, in the transfer device according to the first aspect, the belt unit is supported by the unit support housing without restricting the posture or attitude of the belt unit around the moving direction of the transfer belt at the transfer nip, and the posture or attitude of the belt unit can be changed around the moving direction of the transfer belt with respect to the unit support housing. Due to such a configuration, when the close side of the transfer belt between the pair of portions of the transfer belt on one side and the other side in the axial direction contacts the image carrier and then the far side of the transfer belt contacts the image bearer, the far side of the transfer belt gets close to the image carrier while the posture or attitude of the belt unit around the moving direction of the transfer belt is being changed by the pressing force of one of the pair of pressure members on the far side of the transfer belt or while the belt unit is inclined with reference to the axial direction when viewed in the moving direction of the transfer belt, and the far side of the transfer belt contacts the image carrier.

As described above, in the transfer device according to the first aspect, the posture of the belt unit around the moving direction is changed. Due to such a configuration, the pair of portions of the transfer belt on one side and the other side in the axial direction can contact the image bearer while substantially maintaining the twist of the belt unit under normal conditions, and the speed at which the belt imbalance of the transfer belt gets worsened can be prevented from exceeding a permissible value.

Ninth Aspect

In the transfer device according to the eighth aspect, the unit support housing such as the drawer housing 113 includes a first support portion such as the front rotary shaft support 116 that rotatably supports one end of the belt unit such as a front portion of the belt unit in an axial direction, and a second support portion such as the rear rotary shaft support 117 that rotatably supports another end of the belt unit such as a rear portion of the belt unit in an axial direction. In the ninth aspect, the belt unit is, for example, the secondary transfer unit 40, and the first support portion and the second support portion support the belt unit without restricting the posture attitude of the belt unit at the transfer nip around the moving direction of the transfer belt. The moving direction of the transfer belt is parallel to, for example, the Y-axis direction.

With the transfer device according to the eighth aspect of the present disclosure, as described above in the embodiments of the present disclosure, the belt unit such as the secondary transfer unit 40 can be prevented from being further twisted when the transfer nip is formed.

Tenth Aspect

In the transfer device of the ninth aspect, one of the pair of biasing members such as the front rotary arm 108 is rotatably supported by the first support portion, and another of the pair of biasing members such as the rear rotary arm 109 is rotatably supported by the second support portion.

With the transfer device according to the ninth aspect of the present disclosure, as described above in the embodiments of the present disclosure, the center of rotation of the secondary transfer unit 40 can substantially be matched to the center of rotation of the pair of biasing members such as a pair of rotary arms including the front rotary arm 108 and the rear rotary arm 109. Due to such a configuration, when the pressure at the transfer nip such as the pressure at the second transfer nip is adjusted, changes in the pressing position of the pair of biasing members on the secondary transfer roller can be reduced. According to such a configuration, changes in pressing force due to the changes in the pressing position of the pair of biasing members on the secondary transfer roller can be reduced, and the pressure at the transfer nip can precisely be adjusted.

Eleventh Aspect

In the transfer device according to the ninth aspect or the tenth aspect, the second support portion such as the rear rotary shaft support 117 has the trench 117*a* into which a supported portion such as the shaft 118 of the belt unit such as the secondary transfer unit 40 is inserted. In the trench 117*a*, the supported portion has a degree of freedom in a pressing direction in which the pair of biasing members such as the front rotary arm 108 and the rear rotary arm 109 press the belt unit when the transfer nip is formed.

With the transfer device according to the ninth aspect of the present disclosure, as described above in the embodiments of the present disclosure, the transfer belt can be prevented from being displaced or shifted, when the transfer nip is formed, at the transfer nip in the moving direction parallel to the Y-axis direction between the pair of portions of the transfer belt on one side and the other side, which are, for example, front and rear portions of the transfer belt, in the axial direction.

Twelfth Aspect

In the transfer device according to the eleventh aspect, the trench 117*a* has an arc shape around the rotation center of a transfer roller such as the secondary transfer roller 41.

With the transfer device according to the ninth aspect of the present disclosure, as described above in the embodiments of the present disclosure, compared with a trench that extends in the pressing direction, in the trench 117*a*, the transfer belt can be prevented from being displaced or shifted, when the transfer nip is formed, at the transfer nip in the moving direction parallel to the Y-axis direction between the pair of portions of the transfer belt on one side and the other side, which are, for example, front and rear portions of the transfer belt, in the axial direction.

Thirteenth Aspect

In the transfer device according to any one of the eighth to twelfth aspects, one of the plurality of tension rollers has an inclination adjustable with respect to the axial direction.

Due to such a configuration, as described above with reference to FIG. 6, the belt unit such as the secondary transfer unit 40 can reduce the belt imbalance of the transfer belt due to the twist under normal conditions.

Fourteenth Aspect

In the transfer device according to any one of the eighth to thirteenth aspects, the transfer belt is a secondary transfer belt.

Due to such a configuration, the belt imbalance of the secondary transfer belt can be reduced.

Fifteenth Aspect

In an image forming apparatus including a transfer device such as the secondary transfer device 400, the transfer device according to any one of the eighth to fourteenth aspects is used as the transfer device. Due to such a configuration, the belt imbalance of the transfer belt such as the secondary transfer belt can be reduced.

Note that numerous additional modifications and variations are possible in light of the above teachings. It is therefore to be understood that within the scope of the appended claims, the embodiments of the present disclosure may be practiced otherwise than as specifically described herein. For example, elements and/or features of different illustrative embodiments may be combined with each other and/or substituted for each other within the scope of this disclosure and appended claims.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application-specific integrated circuit (ASIC), digital signal processor (DSP), field-programmable gate array (FPGA), and conventional circuit components arranged to perform the recited functions.

What is claimed is:

1. A transfer device comprising:

a belt unit having a transfer belt looped around a plurality of tension rollers including a transfer roller;

a unit support housing including a first support portion to support one end of the belt unit rotatably in an axial direction, and a second support portion to support another end of the belt unit rotatably in the axial direction, the unit support housing supporting the belt unit through the first support portion and the second support portion around a moving direction of the transfer belt;

a pair of biasing members, one of the pair of biasing members being rotatably supported by the first support portion and pressing one end of each one of the plurality of tension rollers of the belt unit in an axial direction, another one of the pair of biasing members being rotatably supported by the second support portion and pressing another end of each one of the plurality of tension rollers of the belt unit in the axial direction, the transfer roller contacting an image bearer through the transfer belt to form a transfer nip, the second support portion having a trench into which a supported portion of the another end of the belt unit in the axial direction is inserted, the supported portion having a degree of freedom in a pressing direction where the pair of biasing members press the belt unit when the transfer nip is formed, the unit support housing supporting the belt unit without restricting a posture of the belt unit around the moving direction of the transfer belt at the transfer nip; and a driver disposed to rotate to generate rotary driving force to be conveyed to a driven portion provided for one of the plurality of tension rollers, the rotary driving force of the driver acting in a direction different from a direction in which the posture of the belt unit is not restricted.

2. The transfer device according to claim 1, wherein the driver is disposed on one side of the belt unit in the axial direction.

3. The transfer device according to claim 2, wherein the first support portion has a hole into which one end of the supported portion of the belt unit in the axial direction is inserted, and wherein the hole determines a position of the one end of the supported portion with respect to the unit support housing.

4. The transfer device according to claim 1, wherein the trench has an arc shape around a rotation center of the transfer roller.

5. The transfer device according to claim 1, wherein one of the plurality of tension rollers has an inclination adjustable with respect to the axial direction.

6. The transfer device according to claim 1, wherein the transfer belt is a secondary transfer belt.

7. An image forming apparatus comprising a transfer device including:

a belt unit having a transfer belt looped around a plurality of tension rollers including a transfer roller;

a unit support housing including a first support portion to support one end of the belt unit rotatably in an axial direction, and a second support portion to support another end of the belt unit rotatably in the axial direction, the unit support housing supporting the belt unit through the first support portion and the second support portion around a moving direction of the transfer belt;

a biasing member including a pair of biasing members, one of the pair of biasing members being rotatably supported by the first support portion and pressing one end of each one of the plurality of tension rollers of the belt unit in an axial direction, another one of the pair of biasing members being rotatably supported by the second support portion and pressing another end of each one of the plurality of tension rollers of the belt unit in the axial direction, the transfer roller contacting an image bearer through the transfer belt to form a transfer nip, the second support portion having a trench into which a supported portion of the another end of the belt unit in the axial direction is inserted, the supported portion has a degree of freedom in a pressing direction where the pair of biasing members press the belt unit when the transfer nip is formed, the unit support housing supporting the belt unit without restricting a posture of the belt unit around the moving direction of the transfer belt at the transfer nip; and a driver disposed to rotate to generate rotary driving force to be conveyed to a driven portion provided for one of the plurality of tension rollers, the rotary driving force of the driver acting in a direction different from a direction in which the posture of the belt unit is not restricted.

* * * * *